3,491,069
ETHYLENE - PROPYLENE - DIENE TERPOLYMER
VULCANIZATES WITH LIMITED BLOOMING
Lester A. Brooks, East Norwalk, Conn., and Robert T.
O'Shaughnessy, Etobicoke, Ontario, Canada, assignors
to R. T. Vanderbilt Company, Inc., New York, N.Y.,
a corporation of New York
No Drawing. Filed Apr. 12, 1967, Ser. No. 630,201
Int. Cl. C08d 13/28
U.S. Cl. 260—79.5        5 Claims

ABSTRACT OF THE DISCLOSURE

The invention is concerned with a process for vulcanizing rubber. It is also concerned with a vulcanizate without unsightly accelerator bloom. In this invention, ethylene - propylene - diene terpolymer rubbers have an unsymmetrical tetraalkylthiuram monosulfide and other ingredients therein.

---

In the past, ethylene-propylene-diene terpolymer rubbers, designated by the ASTM as EPDM rubbers, have been vulcanized by employing sulfur, 2-mercaptobenzothiazole and tetramethylthiuram monosulfide. However, unsightly white accelerator bloom develops on black stocks within a few days after this vulcanization.

Accelerator blooming is an art-recognized phenomenon. The exact nature of the phenomenon is not understood, but it is known to relate to the formation, during sulfur vulcanization, of powdery white zinc dialkyldithiocarbamate from the symmetrical thiuram monosulfide, sulfur and zinc oxide therein.

If symmetrical tetraalkylthiuram monosulfide is used in low amounts (1.5 phr.) without a thiazole in the sulfur vulcanization of EPDM rubber, it was found that there was little if any accelerator bloom but the rate and state of cure is not as high as might be desired. If, however, symmetrical tetraalkylthiuram monosulfide was used in high amounts (3 phr.) without a thiazole, it was found that there was a desirable high rate and state of cure but there was heavy accelerator bloom.

It has now been discovered that an EPDM rubber vulcanizate can be formed which has a desirable high rate and state of cure, i.e., high modulus and tensile strength, and which is substantially free from accelerator bloom. Thus, in accordance with one embodiment of the invention, EPDM rubber is cured in the presence of sulfur, a thiazole and an unsymmetrical tetraalkylthiuram monosulfide.

Ethylene - propylene - diene terpolymer (EPDM) rubbers are well known in the art [Waddell et al., Properties of a New Unsaturated Ethylene-Propylene Elastomer, Rubber Age, vol. 94, No. 3, p. 427 (December 1963); Cornell et al., Dimethacrylate Monomer Cure of EPDM: Effect of Unsaturation, Rubber World, 152 (1), p. 66 (April 1965)]. The EPDM rubber is made from three monomers, i.e., ethylene, propylene and a non-conjugated diene. The EPDM rubber has a saturated carbon-to-carbon backbone with unsaturation in the sidechains. The molecules are flexible polymethylene chains having methyl groups (from the propylene monomer) attached at frequent intervals and pendant unsaturated hydrocarbon groups (from the particular diene monomer) at less frequent intervals. The diene monomers for copolymerization with ethylene and propylene may be straight chain or ring compounds, usually non-conjugated. These monomers include, among others, the following: cylopentadiene, alkylcyclopentadiene, dicyclopentadiene, 1,4-hexadiene, 1,5-hexadiene, 1,5-pentadiene, 1,9-decadiene, 1,5-cyclooctadiene, 11-ethyl-1,11-tridecadiene, trivinylmonocycloalkane, 4,7,8,9-tetrahydroindane, and 5-methylene-2-norbornene. The quantity of diene monomer is generally from about 0.5 to 10 mole percent, but about 3 to 5 mole percent is preferred.

The unsymmetrical tetraalkylthiuram monosulfides employed in the present invention have the following generic structure:

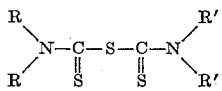

wherein R and R' are selected independently from an alkyl group having 1 to 6 carbon atoms but R and R' are different alkyl groups. The preferred sulfides are diethyldimethylthiuram monosulfide, diethyldipropylthiuram monosulfide, diethyldibutylthiuram monosulfide and mixtures thereof. These sulfides may be prepared by any suitable method. One suitable method is disclosed in U.S. Patent No. 2,524,081 which is incorporated herein by reference.

In the present invention, the EPDM rubber is cured in the presence of sulfur and a thiazole accelerator in combination with the aforementioned unsymmetrical tetraalkylthiuram sulfides. The thiazole accelerators are well known in the art (U.S. Patent No. 2,850,553). Preferred thiazoles have the following beneric structure:

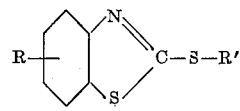

in which R is hydrogen, chlorine, lower alkyl, lower alkoxy or nitro and R' is hydrogen, a divalent metal such as zinc or lead, 2-thiobenzothiazolyl or —NR"R''' in which R" and R''' are independently selected from hydrogen, lower alkyl, cycloalkyl, phenyl or substituted phenyl, or are combined through —CH$_2$—, N, or —O— to form heterocyclic radicals, to give the 2-benzothiazole sulfenamides. Especially preferred thiazoles are 2-mercaptobenzothiazole, benzothiazolyl disulfide, N-cyclohexylbenzenethiazole - 2 - sulfenamide, N - dioxydiethylenebenzothiazole-2 - sulfenamide, zinc 2 - benzothiazolyl sulfide and mixtures thereof.

The proportions of the compounds in the curing system may vary over a wide range. The range of unsymmetrical tetraalkylthiuram monosulfide is generally about 0.5 to 5.0 phr., preferably 1.0 to 2.0 phr. The range of thiazole accelerator is generally about 0.25 to 3.0 phr., preferably 1.0 to 1.5 phr. The range of sulfur is generally about 0.5 to 5.0 phr., preferably 1.0 to 2.0 phr. The curing system also usually contains about 1.0 to 25 phr., preferably 2.0 to 5.0 phr. of zinc oxide.

Other ingredients may be included in the system for curing the EPDM rubber. The following optional ingredients, among others, are applicable: antioxidants, antiozonants, flex cracking agents, fillers, pigments, extenders, lubricants, plasticizers, tackifiers and colorants. Use of these ingredients is well known in the art.

Any suitable curing procedure and conditions may be employed in the present invention such as steam curing and air curing. Preferably, the compounded rubber is press cured at a temperature between 280° F. and 345° F. for 10 to 120 minutes.

Thus, in accordance with this invention, an ethylene-propylene-diene terpolymer rubber (EPDM rubber) has been cured to provide accelerator bloom-free vulcanizate with a high rate and state of cure. In other words, a vulcanizate of the invention has high modulus and tensile strength without accelerator bloom.

The following examples are submitted to illustrate but not to limit this invention. Unless otherwise indicated, all parts and percentages in the specification and claims are based upon weight.

Example I

Tetraethylthiuram disulfide (296 grams; 1.0 mole) was slurried with 300 ml. of 1,1,1-trichloroethane and treated with chlorine (71 grams; 2.0 moles) with stirring and cooling to maintain a temperature of 24–40° C. After five minutes, all of the solid was dissolved, and when 60 grams of the chlorine was added, sulfur began to precipitate. After all of the chlorine was added, the mixture was cooled to 15° C. and stirred at this temperature for 30 minutes. The resulting crude diethylthiocarbamoyl chloride solution was filtered to remove the precipitated sulfur and sulfur chloride. The filtrate was added with stirring to an aqueous 12% solution of sodium dimethyldithiocarbamate (2380 grams; 2.0 moles). The reaction mixture was heated and stirred at 45–55° C. for one hour. The heterogeneous mixture therefrom was cooled and transferred to a separatory funnel, and the organic layer was separated and washed with water. The trichloroethane solution was cooled to 15° C. and filtered to remove precipitated sulfur. The solvent was removed subsequently on a rotary film evaporator, leaving a residue of amber colored diethyldimethylthiuram monosulfide. Diethyldipropylthiuram monosulfide and diethyldibutylthiuram monosulfide were prepared by using the same process except that the appropriate reactant was employed.

Vulcanizates A, A', B, B', C, C', D, D', E and E' were formed by compounding ethylene-propylene-diene monomer rubber samples (EPT 3509 of Enjay Chemical Co.) separately with or without a thiazole, with the aforementioned monosulfides (see Table 2) and with other ingredients indicated in Table 1 herebelow:

TABLE 1

| Ingredients: | Parts by wt. |
|---|---|
| EPDM rubber [1] | 100 |
| Stearic acid | 1 |
| Zinc oxide | 5 |
| Agerite Resin D [2] | 1 |
| HAF carbon black | 75 |
| MT carbon black | 75 |
| Processing oil [3] | 35 |
| Plasticizer oil [4] | 15 |
| Sulfur | 1.5 |
| 2-mercaptobenzothiazole | ([5]) |
| Thiuram monosulfide | ([5]) |

[1] EPT 3509; contains 55% ethylene, 2.6% unsaturation due to methylene norbornene as the non-conjugated diene monomer and propylene as the third monomer; specific gravity of 0.86; Mooney (1+8) minutes at 260° F. of 63.
[2] Antioxidant; polymerized trimethyl dihydroquinoline.
[3] Flexon 580.
[4] Plastogen.
[5] See Table 2.

The compounded samples were press cured at 345° F. for 20 minutes. The following physical properties of the vulcanizates therefrom were determined: modulus, tensile strength and elongation in accordance with ASTM Method D-412 and hardness in accordance with ASTM Method D-2240. The vulcanizates also were examined visually for accelerator bloom after storage for one, two and four weeks. The results are listed in Table 2.

TABLE 2

| | Vulcanizate (Parts By Weight) | | | | | | | | | |
|---|---|---|---|---|---|---|---|---|---|---|
| | A | A' | B | B' | C | C' | D | D' | E | E' |
| Compounds: | | | | | | | | | | |
| 2-mercaptobenzothiazole | 1.5 | | 1.5 | | 1.5 | | 1.5 | | 1.5 | |
| Thiuram monosulfide: | | | | | | | | | | |
| Tetramethyl | 1.5 | 1.5 | | | | | | | | |
| Diethyl dimethyl | | | 1.5 | 1.5 | | | | | | |
| Tetraethyl | | | | | 1.5 | 1.5 | | | | |
| Diethyl dipropyl | | | | | | | 1.5 | 1.5 | | |
| Diethyl dibutyl | | | | | | | | | 1.5 | 1.5 |
| Physical Properties: | | | | | | | | | | |
| Modulus (p.s.i.) | 1,580 | 1,390 | 1,530 | 1,240 | 1,550 | 1,070 | 1,500 | 960 | 1,410 | 880 |
| Tensile strength (p.s.i.) | 1,760 | 1,630 | 1,530 | 1,430 | 1,550 | 1,390 | 1,670 | 1,300 | 1,580 | 1,280 |
| Elongation (percent) | 370 | 420 | 300 | 410 | 320 | 480 | 370 | 520 | 380 | 550 |
| Hardness | 70 | 66 | 70 | 64 | 70 | 64 | 69 | 62 | 68 | 61 |
| Accelerator Bloom After Storage: | | | | | | | | | | |
| 1 week | Heavy | None | None | None | Light | None | None | None | None | None |
| 2 weeks | Heavy | None | None | None | Heavy | None | None | None | None | None |
| 4 weeks | Heavy | None | None | None | Heavy | None | None | None | None | None |

This example demonstrates the superiority with respect to accelerator bloom of vulcanizates B, D and E compounded with both a thiazole accelerator and an unsymmetrical thiuram sulfide as compared with control vulcanizates A and C compounded with both a thiazole accelerator and a symmetrical thiuram sulfide. Only vulcanizates B, D and E of the invention have a high rate and state of cure without accelerator bloom.

Example II

Vulcanizate F was provided by adding 1.5 phr. of 2-mercaptobenzothiazole and 1.5 phr. of diethyldimethylthiuram monosulfide to the compounded rubber of Table 1. Vulcanizate G was provided with tetramethylthiuram monosulfide as a control. The compound rubbers were press cured for 20 minutes at 345° F. The physical properties of the resulting vulcanizates were determined as described in Example I. The accelerator bloom after storage was determined visually. The results are shown in Table 3.

TABLE 3

| | Vulcanizates (Parts by Weight) | |
|---|---|---|
| | F | G |
| Compounds: | | |
| 2-mercaptobenzothiazole | 1.5 | 1.5. |
| Thiuram monosulfide: | | |
| Tetramethyl | | 1.5. |
| Diethyl dimethyl | 1.5 | |
| Physical Properties: | | |
| Modulus (p.s.i.) | 1,550 | 1,550. |
| Tensile strength (p.s.i.) | 1,730 | 1,730. |
| Elongation (percent) | 370 | 370. |
| Hardness | 70 | 70. |
| Accelerator Bloom After Storage: | | |
| 1 week | None | Medium. |
| 2 weeks | do | Heavy. |
| 4 weeks | do | Do. |

It is evident from this example that vulcanizate F of the invention had no accelerator bloom after storage for four weeks whereas control vulcanizate G had accelerator bloom after storage for only one week. Furthermore, the physical properties of vulcanizate F were the same as the physical properties of vulcanizate G.

Example III

Three different EPDM rubbers were compounded with the same ingredients indicated in Table 1 to provide vulcanizates H, I and J. Vulcanizate H and the control H' were made from EPT 3509 of Enjay Chemical Co. Vulcanizate I and control I' were made from Royalene X300 of Naugatuck Chemical Co. Vulcanizate J and control J' were made from Nordel 1070 of Du Pont.

The compounded rubbers were cured as described in Example I. The tests of Example I were performed on the vulcanizates therefrom and the results thereof and bloom observations at 1, 2, 4 and 60 weeks are recorded in the following table:

ing for 20 minutes at 345° F., the accelerator bloom was observed after 1 week, 4 weeks, 2 months and 4 months. The results are presented in Table 6.

TABLE 4

|  | Vulcanizates (Parts By Weight) | | | | | |
|---|---|---|---|---|---|---|
|  | EPT 3509 | | Royalene X300 [a] | | Nordel 1070 [b] | |
|  | H | H' | I | I' | J | J' |
| Compounds: | | | | | | |
| 2-mercaptobenzothiazole | 1.5 | 1.5 | 1.5 | 1.5 | 1.5 | 1.5 |
| Thiuram monosulfide: | | | | | | |
| Tetramethyl | | 1.5 | | 1.5 | | 1.5 |
| Diethyl dimethyl | 1.5 | | 1.5 | | 1.5 | |
| Physical Properties: | | | | | | |
| Modulus (p.s.i.) | 1,690 | 1,710 | 1,660 | 1,620 | 1,450 | 1,490 |
| Tensile strength (p.s.i.) | 1,720 | 1,770 | 1,820 | 1,810 | 1,780 | 1,810 |
| Elongation (percent) | 310 | 310 | 380 | 340 | 450 | 440 |
| Hardness | 70 | 71 | 68 | 69 | 65 | 64 |
| Accelerator Bloom After Storage: | | | | | | |
| 1 week | None | Moderate | None | Moderate | None | Light |
| 2 weeks | do | Heavy | do | do | do | Moderate |
| 4 weeks | do | do | do | Heavy | do | Heavy |
| 60 weeks | do | do | do | do | do | Do |

[a] Contains dicyclopentadiene in addition to ethylene and propylene; Mooney (ML-4) at 212° F. of 130; specific gravity of 0.865; iodine number of 10.
[b] Contains 1,4-hexadiene; Mooney (ML 1+4) at 250° F. of 70; specific gravity of 0.85.

The data in Table 4 show that there is accelerator bloom when symmetrical tetraalkylthiuram monosulfidethiazole acceleration is used, while there is no accelerator bloom when unsymmetrical thiuram monosulfide-thiazole acceleration is used in the three EPDM rubbers. The three EPDM rubbers were cured substantially equally by both symmetrical and unsymmetrical tetraalkylthiuram monosulfide since the physical properties were about the same.

Example IV

Separate portions of the formulation of Table 1 were compounded with 1.5 phr. of 2-mercaptobenzothiazole (Captax), benzothiazolyl disulfide (Altax), N-cyclohexyl benzothiazole 2-sulfenamide (Durax) and N-dioxydiethylene benzothiazole 2-sulfenamide (Amax) and 1.5 phr. of tetramethylthiuram monosulfide or 1.0 phr. of diethyldimethylthiuram monosulfide. Controls were also prepared with each thiuram monosulfide alone. The vulcanizates were cured as described in Example I.

The results of physical tests and observations on bloom, which were determined in accordance with Example II, are shown in Table 5.

TABLE 6

|  | Vulcanizates (Parts by Weight) | |
|---|---|---|
|  | K | L |
| Compounds: | | |
| 2-mercaptobenzothiazole | 1.5 | 1.5 |
| Thiuram monosulfide: | | |
| Tetramethyl | 1.5 | |
| Diethyl dimethyl | | 1.5 |
| Accelerator Bloom After Storage: | | |
| 1 week | L | 0 |
| 4 weeks | H | 0 |
| 2 months | H | 0 |
| 4 months | H | 0 |

The above data show the superiority of a vulcanizate compounded with a thiazole and an unsymmetrical thiuram monosulfide as compared with vulcanizate compounded with a thiazole and a symmetrical thiuram monosulfide.

Having set forth the general nature and specific embodiments of the present invention, the true scope is now particularly pointed out in the appended claims.

What is claimed is:

1. A vulcanizable composition for providing a vulcanizate which is substantially free from accelerator bloom and which has a high rate and state of cure comprising about 100 parts of an ethylene-propylene-diene terpolymer rubber; about 0.5 to 5.0 parts of an unsymmetrical tetraalkylthiuram monosulfide having the generic structure:

TABLE 5

|  | 1 | 2 | 3 | 4 | 5 | 6 | 7 | 8 | 9 | 10 | 11 | 12 |
|---|---|---|---|---|---|---|---|---|---|---|---|---|
| Compounds: | | | | | | | | | | | | |
| Thiuram monosulfide: | | | | | | | | | | | | |
| Tetramethyl | 1.5 | 1.5 | 1.5 | 1.5 | 1.5 | | | | | | 3.0 | |
| Diethyl diemthyl | | | | | | 1.0 | 1.0 | 1.0 | 1.0 | 1.0 | | 2.0 |
| Thiazole: | | | | | | | | | | | | |
| Captax | | 1.5 | | | | | 1.5 | | | | | |
| Altax | | | 1.5 | | | | | 1.5 | | | | |
| Durax | | | | 1.5 | | | | | 1.5 | | | |
| Amax | | | | | 1.5 | | | | | 1.5 | | |
| Physical Properties: | | | | | | | | | | | | |
| Modulus (p.s.i.) | 1,580 | 1,780 | 1,770 | 1,600 | 1,620 | 1,030 | 1,630 | 1,580 | 1,390 | 1,590 | 1,720 | 1,440 |
| Tensile strength (p.s.i.) | 1,810 | 1,880 | 1,800 | 1,770 | 1,750 | 1,450 | 1,830 | 1,780 | 1,660 | 1,710 | 1,820 | 1,580 |
| Elongation (percent) | 390 | 340 | 330 | 350 | 350 | 500 | 380 | 380 | 440 | 380 | 320 | 380 |
| Hardness | 66 | 70 | 70 | 69 | 70 | 26 | 68 | 69 | 66 | 68 | 68 | 67 |
| Accelerator Bloom After Storage [a] | | | | | | | | | | | | |
| 1 week | Sl | H | H | M | L | 0 | 0 | 0 | 0 | 0 | L | 0 |
| 4 weeks | Sl | H | H | M | M | 0 | 0 | 0 | 0 | 0 | M | 0 |

[a] 0=none; Sl=Slight; L=Light; M=Moderate; H=Heavy.

This example demonstrates that the addition of a thiazole results in higher physical properties. However, an EPDM rubber compounded with both an unsymmetrical thiuram monosulfide and a thiazole is free from accelerator bloom, whereas an EPDM rubber compounded with both a symmetrical thiuram monosulfide and a thiazole has accelerator bloom.

Example V

Vulcanizates K, L, M and N were prepared from the compounded formulation of Table 1 except that Nordel 1070 rubber of Example III was substituted for EPT 3509 rubber. The vulcanizates contained 1.5 phr. of 2-mercaptobenzothiazole and 1.5 phr. of tetramethylthiuram monosulfide or diethyldimethylthiuram monosulfide. After curing

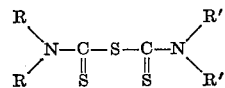

wherein R and R' are selected independently from an alkyl group having 1 to 6 carbon atoms but R and R' are different alkyl groups; about 0.25 to 3.0 parts of a thiazole accelerator; about 0.5 to 5.0 parts of sulfur; and about 1.0 to 25 parts of zinc oxide.

2. The composition according to claim 1 in which the monosulfide is diethyldimethylthiuram monosulfide, diethyldipropylthiuram monosulfide, diethyldibutylthiuram monosulfide or mixtures thereof.

3. The composition according to claim 1 in which the thiazole accelerator is 2-mercaptobenzothiazole, benzothiazolyl disulfide, N - cyclohexylbenzenethiazole - 2 - sulfenamide, N - dioxydiethylenebenzothiazole - 2 - sulfenamide, zinc 2-benzothiazolyl sulfide or mixtures thereof.

4. The composition according to claim 1 in which the monosulfide is diethyldimethylthiuram monosulfide and in which the thiazole accelerator is 2-mercaptobenzothiazole.

5. A vulcanizate having a high modulus and tensile strength without accelerator bloom which comprises about 100 parts of an ethylene-propylene-diene terpolymer rubber; about 0.5 to 5.0 parts of an unsymmetrical tetraalkylthiuram monosulfide having the generic structure:

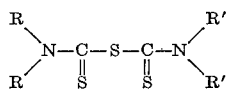

wherein R and R' are selected independently from an alkyl group having 1 to 6 carbon atoms but R and R' are different alkyl groups; about 0.25 to 3.0 parts of a thiazole accelerator; about 0.5 to 5.0 parts of sulfur; and about 1.0 to 25 parts of zinc oxide.

References Cited
UNITED STATES PATENTS 3,379,701   4/1968   Gladding et al. _____ 260—80.7

FOREIGN PATENTS 653,436   5/1951   Great Britain.

OTHER REFERENCES

Hofmann, W.: Vulcanization, Palmerton (New York), 1965, pp. 114–115.

JOSEPH L. SCHOFER, Primary Examiner

C. A. HENDERSON, JR., Assistant Examiner

U.S. Cl. X.R.

260—41.5, 45.8, 785, 786, 788